United States Patent [19]

Rudzki et al.

[11] 4,432,657

[45] Feb. 21, 1984

[54] PYROMETER METHOD FOR MEASURING SLAB TEMPERATURE IN A REHEAT FURNACE

[75] Inventors: Eugene M. Rudzki, Bethlehem; Ronald W. Jackson, Emmaus; Anthony P. Martocci, Bethlehem, all of Pa.

[73] Assignee: Bethlehem Steel Corporation, Bethlehem, Pa.

[21] Appl. No.: 362,346

[22] Filed: Mar. 26, 1982

[51] Int. Cl.³ .............................................. G01J 5/16
[52] U.S. Cl. ..................................... 374/126; 374/128
[58] Field of Search ................ 374/121, 123, 126, 128

[56] References Cited

U.S. PATENT DOCUMENTS

| 2,837,917 | 6/1958 | Machler | 374/126 |
| 2,846,882 | 8/1958 | Gray | 374/126 |
| 3,057,200 | 10/1962 | Wood | 374/123 |
| 3,433,052 | 3/1969 | Maley | 374/126 X |
| 3,451,254 | 6/1969 | Maley | 374/126 X |
| 3,492,869 | 2/1970 | Toyota et al. | 374/126 |
| 4,144,758 | 3/1979 | Roney | 374/126 |

Primary Examiner—Gerald Goldberg
Assistant Examiner—Joseph W. Roskos
Attorney, Agent, or Firm—John I. Iverson; William B. Noll

[57] ABSTRACT

A method and apparatus to measure the temperature of a slab in a reheat furnace with increased accuracy using either a single or dual pyrometer system through use of a multiplicity of temperature correction functions involving temperatures of slab and wall, distance between a pyrometer and the slab at which it is aimed, a ratio of air and fuel supplying the furnace heat and radiation interferences. The functions are chosen by a microprocessor in the system dependent on temperature differentials, emissivity setting of the pyrometer, target distance between pyrometer and slab, and air and fuel flow rates existing and fluctuating in the system.

6 Claims, 2 Drawing Figures

PYROMETER METHOD FOR MEASURING SLAB TEMPERATURE IN A REHEAT FURNACE

BACKGROUND OF THE INVENTION

The present invention refers to a method and apparatus for measuring true slab surface temperature in a reheat furnace, more particularly utilizing one or more pyrometers.

U.S. Pat. No. 4,144,758 of John E. Roney discloses a furnace with a steel slab being heated. One pyrometer is trained on the slab and a second pyrometer detects radiation from a reference plate mounted on the wall. A temperature sensor is mounted within the furnace wall. Outputs of the pyrometers are subtracted at a summing junction. Some of these features are found in the present invention but changes from this in the apparatus and the method of the present invention allow optimization of reheat furnace operation. The corrections which are made to the pyrometer readings of slab radiation are made in a manner and by means not found in the prior art patent.

U.S. Pat. No. 2,846,882 of William T. Gray discloses use of pyrometers receiving radiation from a workpiece and from a reference for a corrected measurement to control the heat applied to the work. Such two pyrometer systems are known in the prior art but the prior art does not show the correction or series of corrections that are made in the present invention to obtain accuracy not readily found in prior art apparatus.

U.S. Pat. No. 3,057,200 of John G. Wood discloses pyrometer detectors of radiation from an object and from a reference and also mention the concept of compensating for distances involved. Such a concept is involved in obtaining true slab temperature in the present invention but this patent still does not describe the aspects of measurement as found in the present invention.

Further background material concerning radiation detectors and attempts to increase the accuracy of their reading is discussed in the background material of the patent of Donald S. Michael, Patent No. 4,005,605. From this background material it is apparent that prior art accuracy was not as good as required and the apparatus and method of the present invention is an attempt to obtain such accuracy that allows the best use of pyrometers in one of their specialized uses of determining true slab temperature of such slab in a reheat furnace.

SUMMARY OF THE INVENTION

It is an object of the present invention to measure the true slab temperature and obtain reliable temperature measurements.

It is a further object of the present invention to obtain these measurements utilizing either single or a dual pyrometer radiation arrangement.

Such measurements require measurement and evaluation of pyrometer to target or work distance, temperature differential between the furnace wall temperature and the slab surface temperature, combustion air/fuel ratio and slab surface emissivity.

It is still another object of the present invention to obtain the advantages of a dual pyrometer system over single system pyrometers and overcome unreliable measurements of prior art dual pyrometer systems.

The present invention includes a method of measuring the temperature of a slab surface in a reheat furnace comprising the steps of measuring radiation from a slab in a furnace, the wall temperature of the furnace, air and fuel flows to the heating means of the furnace, the distance between the slab and the pyrometer measuring radiation from the slab; choosing a temperature correction function from a list of predetermined functions; and obtaining a corrected measurement of the temperature of the slab in accordance with the chosen temperature correction function. When used herein the term "wall" is meant to also include the term "roof".

The present invention also includes the step of continuously correcting the pyrometer readings of slab radiation as measurements indicating fluctuations of wall temperature, air to fuel ratio and type of fuel.

The present invention also includes apparatus for measuring surface temperature of a slab in a reheat furnace comprising a furnace through which the slab passes, a pyrometer measuring means mounted on said furnace to send signals indicating measured radiation from the slab in said furnace, wall temperature measuring means mounted on the wall of said furnace to send out a signal indicating wall temperature, air and fuel flow measuring means mounted on air and fuel intakes of said furnace to send out signals indicating amounts of air and fuel flow, means to choose a temperature correction function from a multiplicity of predetermined functions in accordance with a combination of the distance measurement between the slab and said pyrometer measuring means and said signals from said wall temperature measuring means, and said air and fuel flow measuring means, and means to obtain a corrected measurement of the temperature of the slab by correcting said measurement signal from said pyrometer measuring means in accordance with said chosen temperature correction function.

BRIEF DESCRIPTION OF THE DRAWINGS

These as well as further advantages which are inherent in the invention will become apparent from the following description, reference being had to the accompanying drawing wherein.

DESCRIPTION OF THE PREFERRED EMBODIMENT

Figure 1:
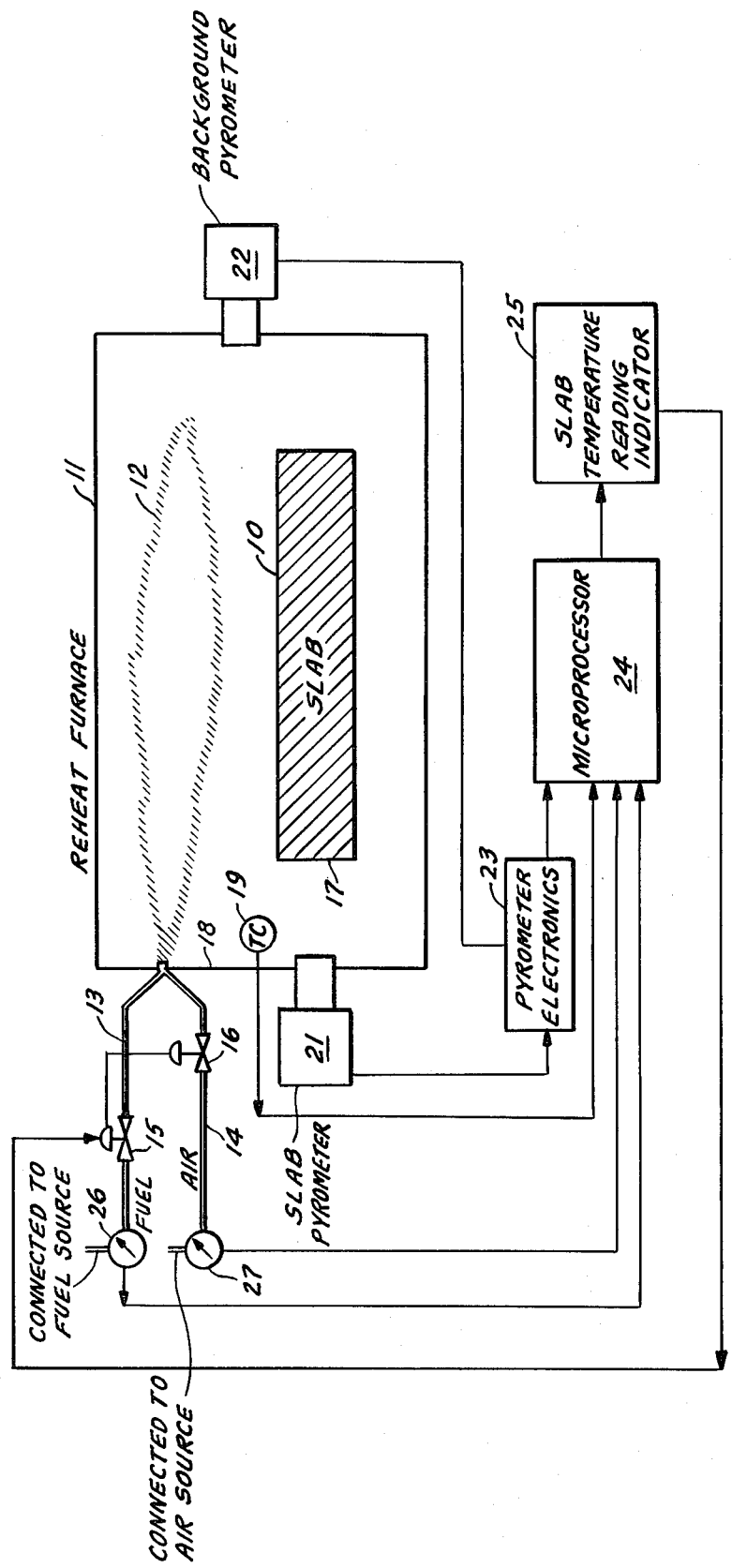
FIG. 1 is a block diagram illustrating the measurement of slab surface temperature in a reheat furnace as in the present invention utilizing dual pyrometers.

FIG. 1 illustrates a slab 10 in reheat furnace 11 heated by flame 12 produced by a mixture from fuel line 13 and air line 14 through valves 15 and 16 respectively.

A slab pyrometer 21 and a background pyrometer 22 are both located for recording conditions within reheat furnace 11. Slab pyrometer 21 looks at the radiation from the surface 17 of slab 10 and sends an electrical signal to a pyrometer electronics package 23. Background pyrometer 22 looks at the radiation from furnace wall 18 which wall faces slab surface 17 on which slab pyrometer 21 is sighted. By knowing the emissivity of slab surface 17, the portion of the slab radiation due to the radiation from furnace wall 18 which is reflected from the slab surface 17 is electronically subtracted from the total radiation from slab surface 17. Dual pyrometer systems use this principle of operation. This corrected pyrometer signal, or uncorrected signal in the case where only a single pyrometer is used, is sent to a microprocessor or minicomputer 24.

The output signal from thermocouple 19 located in furnace 11 is also sent to microprocessor 24. In addition, signals from fuel and air indicators 26 and 27 respectively are also fed to the microprocessor 24 to give an air to fuel ratio signal for use therein. The pyrometer 21 to target at surface 17 distance is also indicated to the microprocessor 24, this being either a set distance as in the figures, a choice of set distances, or a measured distance. These signals are then used to select the temperature correction function which has been stored in microprocessor 24. This function is used to correct the pyrometer reading from electronics package 23 to give an accurate slab temperature reading in indicator 25.

Accurate in-furnace slab temperature readings are obtained from microprocessor 24 and have been determined to be a function of pyrometer to target slab surface distance, temperature differential between the furnace wall temperature and slab surface temperature, combustion air/fuel ratio, and emissivity setting of the pyrometer. These response functions are stored in microprocessor 24 and are used to correct the pyrometer reading, which corrected readings are indicated by indicator 25. As pyrometer and wall thermocouple readings fluctuate, the pyrometer readings are corrected using the temperature correction function. This corrected temperature reading from indicator 25 is connected to send signals to valves 15 and 16 to adjust air and fuel flow rates.

Figure 2:
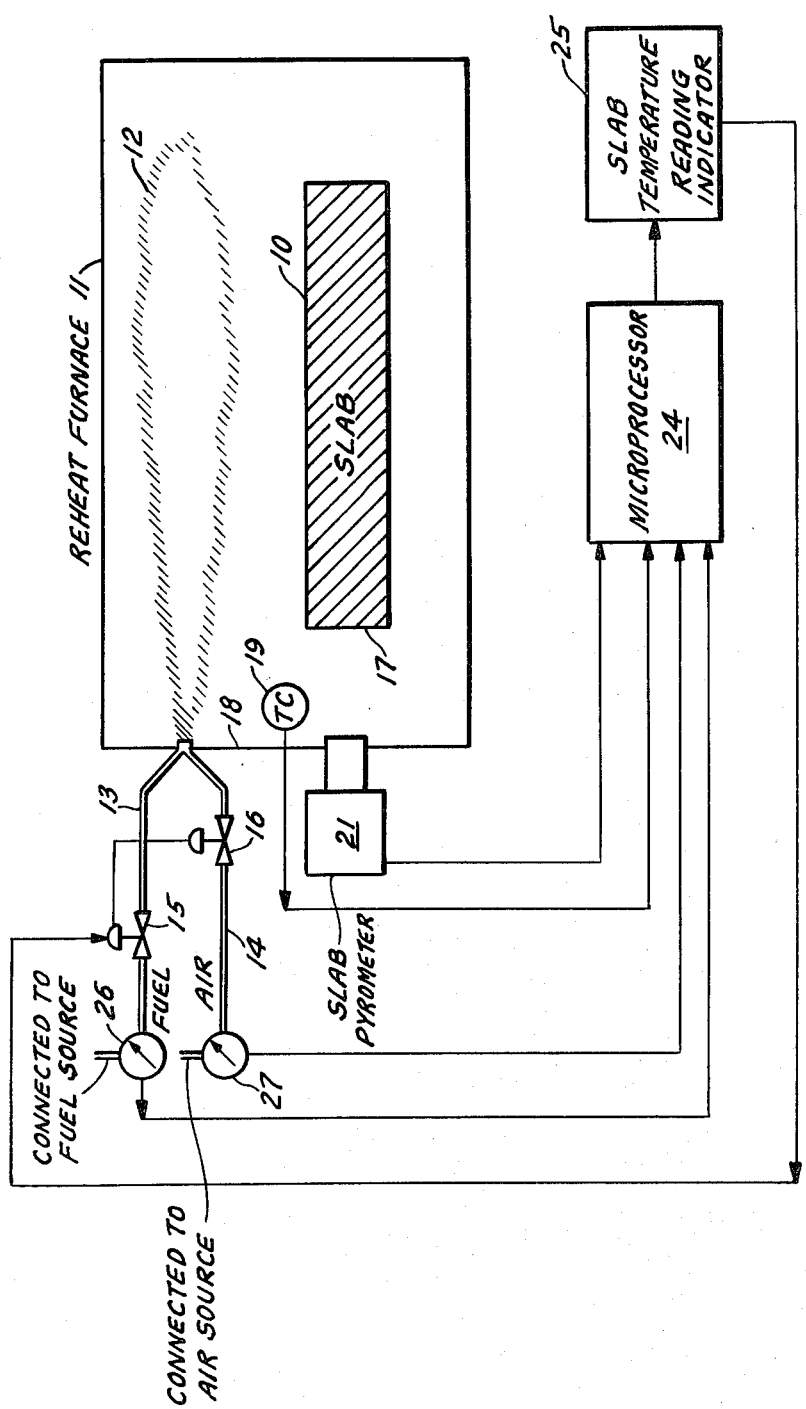
FIG. 2 is a similar type diagram utilizing only a single pyrometer.

An alternative to the dual pyrometer system as illustrated in FIG. 2 is to eliminate background pyrometer 22 and pyrometer electronics package 23 and use slab pyrometer 21 and wall thermocouple 19 as inputs to microprocessor 24 where the reflected wall radiation is computed and subtracted from the total slab pyrometer radiation to give the corrected pyrometer reading at indicator 25.

In setting up the systems of the present invention and to provide for periodic calibration, a spot check of slab surface temperature can be made using a device such as a surface contact thermocouple, Thermophil STOR Unit (ride-through temperature sensing device), water-cooled gold cup, or disappearing filament pyrometer.

It will be obvious to those skilled in the art that various changes may be made without departing from the scope of the invention and the invention is not to be considered limited to what is shown in the drawings and described in the specification.

We claim:

1. A method of measuring slab surface temperature in a reheat furnace comprising the steps of
   measuring radiation from a slab in the furnace,
   measuring wall temperature of the furnace,
   measuring air and fuel flows to the heating means of the furnace to determine an air to fuel ratio,
   measuring the distance between the slab and the pyrometer used for measurement of radiation from the slab,
   choosing a temperature correction function from a list of such predetermined functions in accordance with a combination of the aforementioned measurements of wall temperature, air to fuel ratio, and distance between slab and the pyrometer used for measurement of slab radiation,
   obtaining a corrected measurement of the temperature of the slab by correcting said measurement of temperature of the slab in accordance with the chosen temperature correction function which function is a function of temperature differential of the temperature of the furnace wall minus the temperature of the slab surface, distance between measuring pyrometer and slab surface, combustion air to fuel ratio, and emissivity setting of the pyrometer.

2. The method of claim 1 further characterized by continuously correcting the pyrometer readings of slab radiation as measurements indicate fluctuations of wall temperature, air to fuel ratio and type of fuel.

3. The method of claim 1 further characterized by adjusting air and fuel flow rates in accordance with corrected measurements of temperature.

4. A method of measuring slab surface temperature in a reheat furnace comprising the steps of
   measuring radiation from a slab in the furnace,
   measuring radiation from a wall in the furnace,
   combining the measurements for a first corrected measurement of the temperature of the slab,
   measuring wall temperature of the furnace,
   measuring air and fuel flows to the heating means of the furnace to determine an air to fuel ratio,
   measuring the distance between the slab and the pyrometer used for measurement of radiation from the slab,
   choosing a temperature correction function from a list of such predetermined functions in accordance with a combination of the aforementioned measurements of wall temperature, air to fuel ratio, and distance between slab and the pyrometer used for measurement of slab radiation,
   obtaining a second corrected measurement of the temperature of the slab by further correcting said first corrected measurement of temperature of the slab in accordance with the chosen temperature correction function which function is a function of temperature differential of the temperature of the furnace wall minus the temperature of the slab surface, distance between measuring pyrometer and slab surface, combustion air to fuel ratio, and emissivity setting of the pyrometer.

5. The method of claim 4 further characterized by continuously correcting the pyrometer readings of slab radiation as measurements indicate fluctuations of wall temperature, air to fuel ratio and type of fuel.

6. The method of claim 4 further characterized by adjusting air and fuel flow rates in accordance with corrected measurements of temperature.

* * * * *